United States Patent
Erben et al.

(10) Patent No.: US 6,856,745 B2
(45) Date of Patent: Feb. 15, 2005

(54) WAVEGUIDE AND APPLICATIONS THEREFOR

(75) Inventors: Christoph Georg Erben, Berkeley Heights, NJ (US); Valerie Jeanne Kuck, Upper Montclair, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 244 days.

(21) Appl. No.: 10/188,942

(22) Filed: Jul. 2, 2002

(65) Prior Publication Data

US 2004/0005132 A1 Jan. 8, 2004

(51) Int. Cl.[7] .............................. G02B 6/10; G02B 6/00
(52) U.S. Cl. .................. 385/129; 385/140; 385/147; 522/1
(58) Field of Search ................ 395/13–14, 41, 395/131–135; 385/140–147, 14, 129, 130, 131, 132, 134, 135; 522/1; 252/582, 589, 299.01; 359/1, 328; 430/302; 349/4

(56) References Cited

U.S. PATENT DOCUMENTS

| | | | |
|---|---|---|---|
| 4,889,901 A | 12/1989 | Shama et al. | |
| 5,620,495 A | 4/1997 | Aspell et al. | |
| 5,773,486 A | 6/1998 | Chandross et al. | |
| 5,962,067 A | 10/1999 | Bautista et al. | |
| 6,002,823 A | 12/1999 | Chandross et al. | |
| 6,204,304 B1 | 3/2001 | Houlihan et al. | |
| 6,251,486 B1 | 6/2001 | Chandross et al. | |
| 6,303,056 B1 * | 10/2001 | Fan et al. | 252/582 |
| 2002/0172492 A1 * | 11/2002 | Shelnut et al. | 385/143 |

* cited by examiner

*Primary Examiner*—Akm Enayet Ullah

(57) ABSTRACT

The present invention provides a waveguide, a method of manufacture therefore, and an optical communications system including an optical device comprising the waveguide. The waveguide may comprise a substrate, a planar waveguide core located over the substrate and a cladding layer located adjacent the planar waveguide core, the cladding layer comprising a silsesquioxane oligomer.

23 Claims, 4 Drawing Sheets

WAVEGUIDE AND APPLICATIONS THEREFOR

TECHNICAL FIELD OF THE INVENTION

The present invention is directed, in general, to a waveguide and, more specifically, to a planar optical waveguide, a method of manufacture therefor and optical communications system comprising the waveguide.

BACKGROUND OF THE INVENTION

Waveguides, in particular optical planar waveguides, are important components in semiconductor lasers and optical devices used in communication systems, such as optical switches, couplers, splitters and filters. Planar waveguides may include, for example, a doped silica core formed over a substrate such as a silicon wafer. Typically, a cladding layer, comprised of silicon dioxide, surrounds the core. By virtue of its lower refractive index as compared to the core, the silicon dioxide cladding allows a guided mode of light to form and transmit through the waveguide.

The fabrication of waveguides containing a silicon dioxide cladding may be problematic, however. To function as an effective cladding, the silicon dioxide layer, in some cases, may need to be up to about 15 microns thick. However, expensive speciality equipment is required to produce such thick layers. Additionally, the process for depositing and growing layers of such thickness may take several days. Moreover, for certain devices, a second cladding layer grown above the core waveguide material may take a similar period. As such, planar waveguides containing a silicon dioxide layer are slow and expensive to produce. In addition, silicon dioxide based claddings are prone to cracking and stress-induced changes in refractive index, thus requiring additional procedures to prevent such problems. As an alternative, a number of polymeric materials have been proposed as replacements for silicon dioxide claddings.

To facilitate the optimal performance of a planar waveguide, however, polymeric cladding layers should have several properties. As noted above, the refractive index of the cladding should be lower than the refractive index of the core. Therefore a polymer having a high refractive index (e.g., greater than about 1.6) would severely limit the choice of materials that could be used as the waveguide core. The cladding should also have sufficient thermal and mechanical stability that the formation of additional components requiring the application of heat will not alter the cladding's functionality. Similarly, the cladding should have sufficient thermo-mechanical stability to function during high temperature applications, such as greater than about 175° C. In addition, the cladding should be resistant to stress, cracking and delamination from the substrate or core, all of which may reduce the cladding's ability to prevent light losses. Furthermore, the cladding should be capable of providing a uniform planar interface for the core, so as to reduce losses due to light scattering. Similarly, the cladding layer should have a uniform refractive index throughout. And, the cladding layer should be inexpensive and rapid to fabricate.

Previously proposed polymeric materials, however, fail to possess one or more of these properties. For example, polymeric materials having a refractive index equal to or greater than the refractive index of the core waveguide, are unsuitable for use as a cladding. The use of certain polymers, for example, ultraviolet-cured acrylates, is unfavorable at temperatures greater than about 120° C. Yet other polymers, for example, fluorinated acrylates or poly dimethyl silicones, may have poor adhesive properties with respect to the substrate or core, and therefore prone to delamination.

Still other polymers, for example, certain cyclic olefin copolymers, polycarbonates or certain polyimides, are not liquids at room temperature, and thus need to be dissolved in a solvent to be applied as a cladding layer. This, in turn, may unfavorably limit the thickness of the cladding layer that can be deposited in a single pass. Consequently, additional coating steps may be required, thereby increasing the time and cost to produce the waveguide. It may also be necessary to have additional steps to at least partially remove the solvent prior to curing the polymer. And, the evaporation of residual solvent during the coating process may result in a nonuniform surface, with consequent greater light scattering losses.

In addition, solvent free operations present a number of environmental advantages. For example, the need to comply with environmental regulations associated with the use of certain solvents is avoided. The need for special equipment to ensure adequate ventilation of solvents or to handle solvent wastes is also obviated.

Therefore, previously proposed waveguides having a polymeric cladding layer lack the desired characteristics demanded by today's communications industry. Accordingly, what is needed in the art is a waveguide that meets the stringent requirements of the communications industry, while not experiencing the problems associated with previous waveguides.

SUMMARY OF THE INVENTION

To address the above-discussed deficiencies, one embodiment of the present invention provides a planar waveguide comprising a substrate, a planar waveguide core layer located over the substrate and one or more cladding layers located adjacent the core layer. The cladding layers comprise one or more silsesquioxane oligomers. The silsesquioxane oligomers further comprise a methyl pendant group and one or more pendant groups selected from the group consisting of a dimethyl group and a phenyl group. In another embodiment, the planar waveguide comprises a polymeric cladding layer located between a substrate and a planar waveguide core, the cladding layer comprising a silsesquioxane oligomer.

In another embodiment, the invention further provides a method of manufacturing a waveguide. The method comprises providing a substrate, forming a planar waveguide core over the substrate and depositing one or more cladding layers comprising one or more of the above-described silsesquioxane oligomers adjacent the planar waveguide core.

Yet another embodiment of the present invention provides an optical communication system. The system comprises an optical device and input and output optical fibers coupled to an optical modulator. The optical device includes a waveguide comprising a substrate, a planar waveguide core and a cladding layer located adjacent the planar waveguide core. The cladding layer comprises one or more of the above-described silsesquioxane oligomers.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the scope of the invention.

BRIEF DESCRIPTION OF THE DRAWINGS

The invention is best understood from the following detailed description, when read with the accompanying FIGUREs. It is emphasized that in accordance with the standard practice in the optoelectronic industry, various features may not be drawn to scale. In fact, the dimensions of the various features may be arbitrarily increased or reduced for clarity of discussion. Reference is now made to the following descriptions taken in conjunction with the accompanying drawings, in which.

DETAILED DESCRIPTION

The present invention recognizes the advantageous use of a planar waveguide that includes a cladding layer comprising a silsesquioxane oligomer. Such cladding layers possess a number of desirable properties that impart superior performance to the waveguide, as compared to waveguides having a cladding comprised of previously proposed polymeric materials. Moreover, the waveguide can be produced using a more rapid and inexpensive process, as compared to waveguides having a silicon dioxide cladding.

Figure 1:
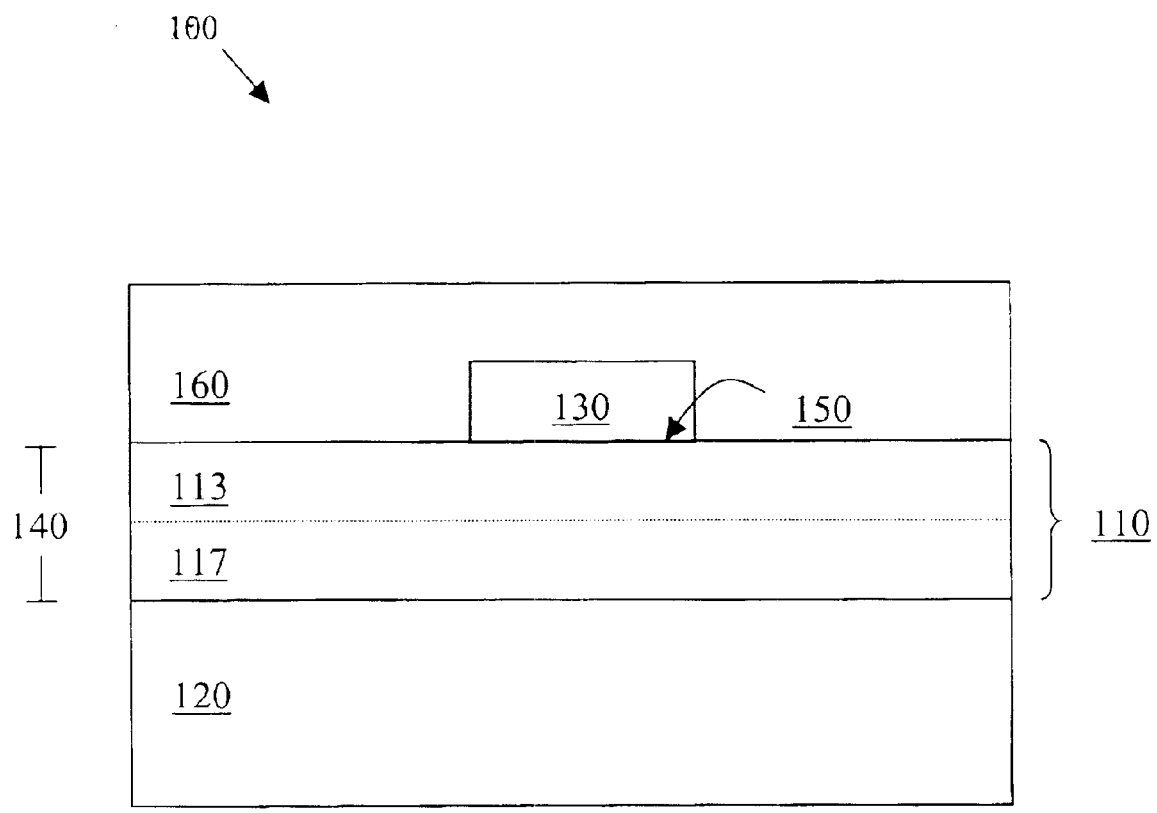
FIG. 1 illustrate a membranous cross-sectional view of one embodiment of a waveguide constructed according to the principles of the present invention.

Referring initially to FIG. 1, illustrated is a cross sectional view of one embodiment of a waveguide 100 constructed according to the principles of the present invention. The waveguide 100 includes a cladding 110, a substrate 120 and a planar waveguide core 130. The cladding 110 is located adjacent the core 130, for example, between the substrate 120 and the core 130 as depicted in FIG. 1. The substrate 120 may be comprised of, for example, glass, silicon, silica, plastic or other well known materials used in the fabrication of optoelectric devices.

The term planar waveguide core 130 as used herein refers to any material that is transparent to one or more wavelengths of light comprising, for example, an optical signal. In addition, the planar waveguide core 130 preferably has at least one substantially planar surface that is substantially parallel to the cladding 110, as defined by the deposition and patterning process used to form the core 130. In still other preferred embodiments, the core 130 may have a substantially rectangular shape, although square and trapezoid shapes are also within the scope of the present invention. In other embodiments, the core 130 may be substantially cylindrical.

The materials that comprise waveguide cores 130, and methods to form such cores 130, are well known to those of ordinary skill in the art. Certain example of such materials and methods have been described in U.S. Pat. No. 6,002,823 to Chandross et al. ("Chandross"), incorporated herein by reference. In certain embodiments, the core 130 may comprise a material having a refractive index sufficient to create a difference in the refractive index between the core 130 and cladding 110 so as to allow a guided mode of light to form an transmit through the core 130. For example, the cladding may have a refractive index between about 0.01 and about 22%, and more preferably between about 0.3 and about 1.2%, lower than a refractive index for the planar waveguide core 130.

In certain embodiments, the core 130 may comprise silicon dioxide containing a dopant, such as phosphorus or germanium. In such embodiments, the silicon dioxide may be formed from a sol gel using conventional low temperature processing conditions.

In other advantageous embodiments, the core 130 may comprise an organic polymer having a refractive index of between 1.4 and 1.8, more preferably between 1.45 and 1.7. The organic polymer may comprise, for example, acrylate, epoxides polyimides, cyclic olefin copolymers or combinations thereof. In other preferred embodiments, the organic polymer may comprise a copolymer of polymethylmethacrylate (PMMA) and hydroxyethylmethacrylate (HEMA). In still other preferred embodiments, the ratio of PMMA:HEMA equals about 9:1. In yet other preferred embodiments, the core may comprise a silsesquioxane having a refractive index greater than the refractive index of the silsesquioxane used for the cladding. In other embodiments, the core 130 may further contain one of more chromophores, such as commercially available disperse red 1 dye (Sigma-Aldrich Chemicals, St. Louis, Mo.), well known to those skilled in the art.

The cladding 110 between the substrate 120 and core 130 is preferably comprised of a silsesquioxane oligomer. The synthesis of the silsesquioxane oligomer may be carried out for example, as described in U.S. Pat. No. 5,962,067 to Bautista et al. ("Bautista"), incorporated herein by reference. Silsesquioxane monomers and oligomers may be obtained from commercial sources, such as product number 630S, from Techneglas Corp., Perrysburg, Ohio.

In the various embodiments, the silsesquioxane oligomer backbone includes one or more pendant groups comprising alkyl and aryl moieties having up to 50 carbon atoms, and more preferably up 25 carbon atoms, and even more preferably up to 8 carbon atoms. In preferred embodiments, the oligomer includes a methyl pendant group, and one or more bulky pendant groups. The term bulky pendant group as used herein, refers to any pendant on the silsesquioxane oligomer backbone occupying a volume that is greater than the volume occupied by the methyl pendant group. The bulky pendant groups comprise, for example, a dimethyl pendant group, a phenyl pendant group or combinations thereof.

The inclusion of methyl pendant groups tend to lower the refractive index of the cladding, and may also impart additional thermostability, as compared to pendant groups such as hydrogen. For example, in certain preferred embodiments, the silsesquioxane oligomer has a decomposition temperature of up to about 500° C., and preferably at least about 400°.

The inclusion of the bulky pendant groups further alters the optical or structural properties of the cladding 110. A dimethyl pendant group, for example, by introducing a variation in the angle of oligomer chain tends to increase the flexibility of the cladding 110, thereby making it more resistant to mechanical stress. A phenyl pendant group may increase flexibility by reducing the cross link network density between methylsiloxy groups.

The desire for improved mechanical-thermal stability may tempered, however, by the need for a cladding 110 having a refractive index that is less than the refractive index of the planar waveguide core 130. The presence of phenyl pendant groups tends to increase the refractive index as compared to a cladding 110 comprised of silsesquioxane oligomers having methyl pendant groups. The presence of dimethyl pendant groups results in a small (i.e., less than about 2%) decrease in the refractive index, as compared to a cladding comprised silsesquioxane oligomers having methyl pendant groups.

In preferred embodiments, the ratio of methyl to dimethyl, or methyl to phenyl, pendant groups typically reflects a balance between a number of factors, such as mechanical-thermal stability, the refractive index of the core or the thickness 140 of the cladding 110. For example, in certain advantageous embodiments, a molar ratio of the methyl pendant groups to dimethyl pendant groups ranges from about 0.5 to about 3.0. In yet other advantageous embodiments, a molar ratio of the methyl pendant group to phenyl pendant group ranges from about 1.0 to about 3.0. In still other preferred embodiments, the ratio of methyl:dimethyl:phenyl equals about 1:1:1.

Regarding the thickness 140 of the cladding 110, the smaller the difference between the refractive index of the cladding 110 and the core 130, the greater the thickness 140 of cladding necessary to avoid optical leakage between the core 130 and substrate 120. In addition, the cladding must have a sufficient thickness 140 so as not crack during other processing steps, or the end use of the waveguide may which involve high temperatures or mechanical stresses. For example, in certain embodiments, the cladding's thickness 140 is at least about 2 microns, more preferably, at least about 10 microns thick, and even more preferably, at least about 15 microns thick.

The uniformity of the cladding's surface 150 between the cladding 110 and the core 130 is an important factor affecting the extent of loss in the intensity of light due to light scattering. The uniformity of the surface 150 may be quantified by measuring surface roughness. The term surface roughness as used herein refers to the average of the root mean square difference in the distance between peaks and valleys as averaged over a portion of the surface 150. Surface roughness may be measured by conventional techniques such as atomic force microscopy, surface profilometers or other techniques well known to those of ordinary skill in the art.

The silsesquioxane containing cladding 110 of the present invention has a superior surface roughness as compared to previously proposed polymeric claddings. The improve surface roughness is due to viscosity properties of silsesquioxane oligomer, and the ability of the oligomer to remain free flowing during curing, further discussed below. For example, in certain embodiments, the cladding layer 110 has a surface roughness that is less than 100 nm. In certain preferred embodiments, the surface roughness of the cladding 110 is less than about 20 nm, and more preferably less than about 10 nm, even more preferably less than about 2 nm, and still more preferably less than about 0.5 nm.

The reduction in light scattering losses afforded by the cladding layer 110 by virtue of having a low surface roughness results in a waveguide 100 having a large throughput of light, comparable, for example, to that attained using silicon dioxide based claddings, and greater than certain other polymeric claddings. To estimate the improvement associated with the low surface roughness, calculation were made for simulated waveguides. The simulated waveguide was assumed to have a cladding of the present invention with a refractive index about 0.01 percent lower than the refractive index of the core. The planar core was assumed to have dimensions of 10 micron by 10 microns (10×10), or 7 microns by 7 microns (7×7) and transmit light at 850 nm. The improvement in light throughput for a surface roughness of 5 nm, as compared to a substantially identical second planar waveguide except that said second planar waveguide has a surface roughness of about 100, was estimated to be at least about 0.3 dB/cm for a 10×10 core, and at least about 0.5 dB/cm for a 7×7 core.

In certain preferred embodiments, the cladding layer 110 may be comprised of a first and second cladding layers, 113, 117. The first cladding layer 113, situated closest to the core 130, may comprise a silsesquioxane oligomer having a refractive index that is higher than the refractive index of the second cladding layer 117, but lower than the refractive index of the core 130. As noted above, a lower refractive index may be achieved by increasing the molar ratio of oligomer comprising methyl pendant groups as compared to, for example, phenyl or dimethyl pendant groups. The first cladding layer 113, situated closest to the core 130, may therefore be comprised of a silsesquioxane oligomer having a higher amounts of, for example, phenyl or dimethyl pendant groups, to impart improved optical waveguide properties to the core 130.

The second cladding layer 117, situated between the first cladding layer 113 and the substrate 120, facilitate s further optical separation of the substrate 120 from the core 130. The second cladding layer 117 may be comprised of any conventional polymeric material, such as those listed herein, having a refractive index lower than the refractive index of the first cladding layer 113. In certain preferred embodiments, however, the second cladding layer 117 may be comprised of a silsesquioxane oligomer. Inverse configures, where the first cladding layer 113 comprises a conventional polymeric material, and the second layer 117 comprises silsesquioxane oligomer and various embodiments discussed herein, are also within the scope of the present invention.

In other advantageous embodiments, the waveguide 100 may further include an upper cladding layer 160 located at least partially over the waveguide core 130. The upper cladding layer 160 may be comprised of one or more layers that include an silsesquioxane oligomer, analogous to the herein-described cladding layer 110 and its optional embodiments. In certain preferred embodiments, the upper cladding layer 160 is comprised of a material, such as a curing agent or adhesion promoter discussed further below, that facilitates adhesion to the core 120 or the cladding layer 110, and thereby deters delamination during further steps in the fabrication of the waveguide 100, or during the waveguide's end use.

Figure 2A:
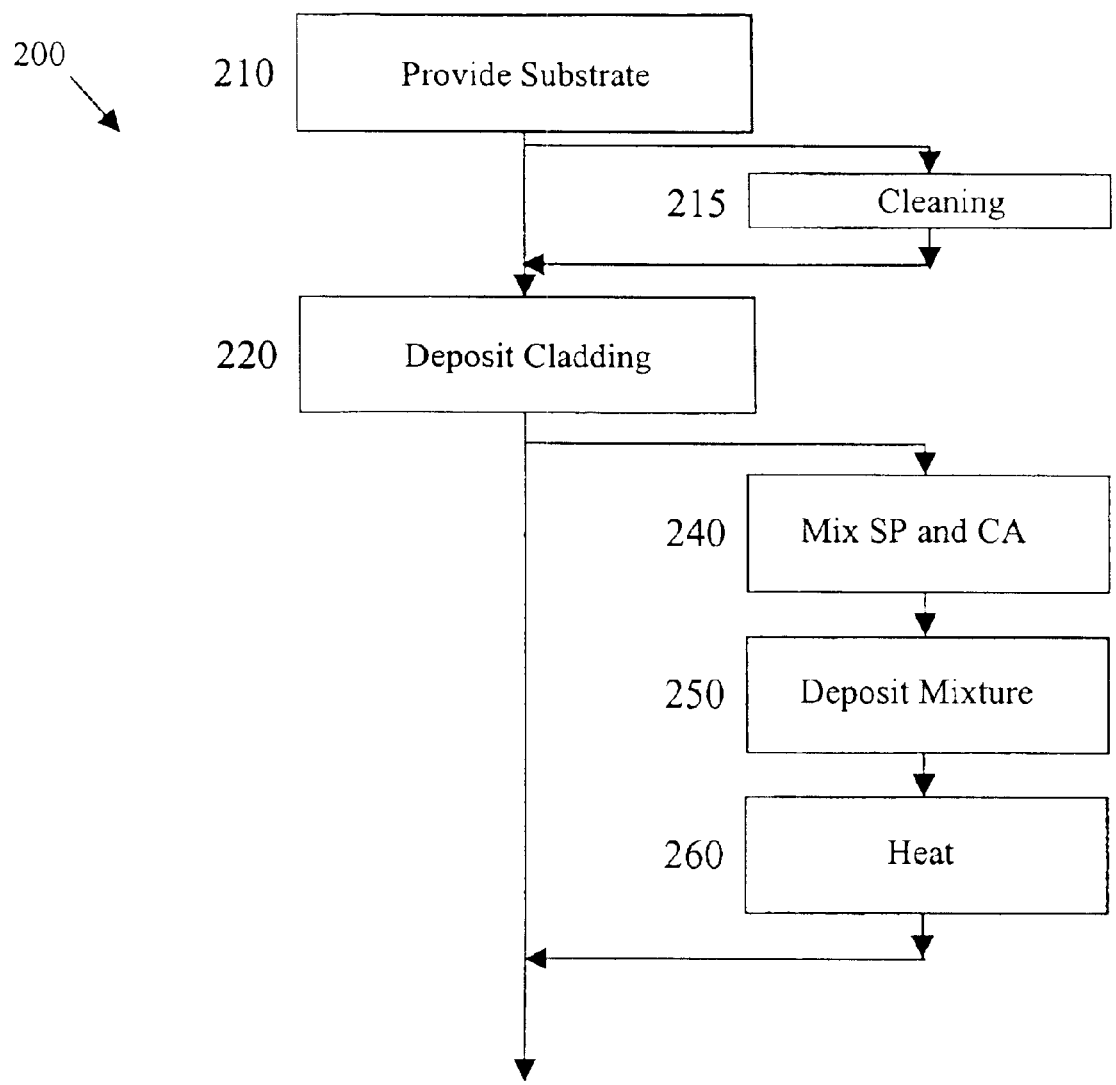
FIG. 2 illustrates, by flow diagram, a method of manufacturing a waveguide according to the present invention.
Figure 2B:
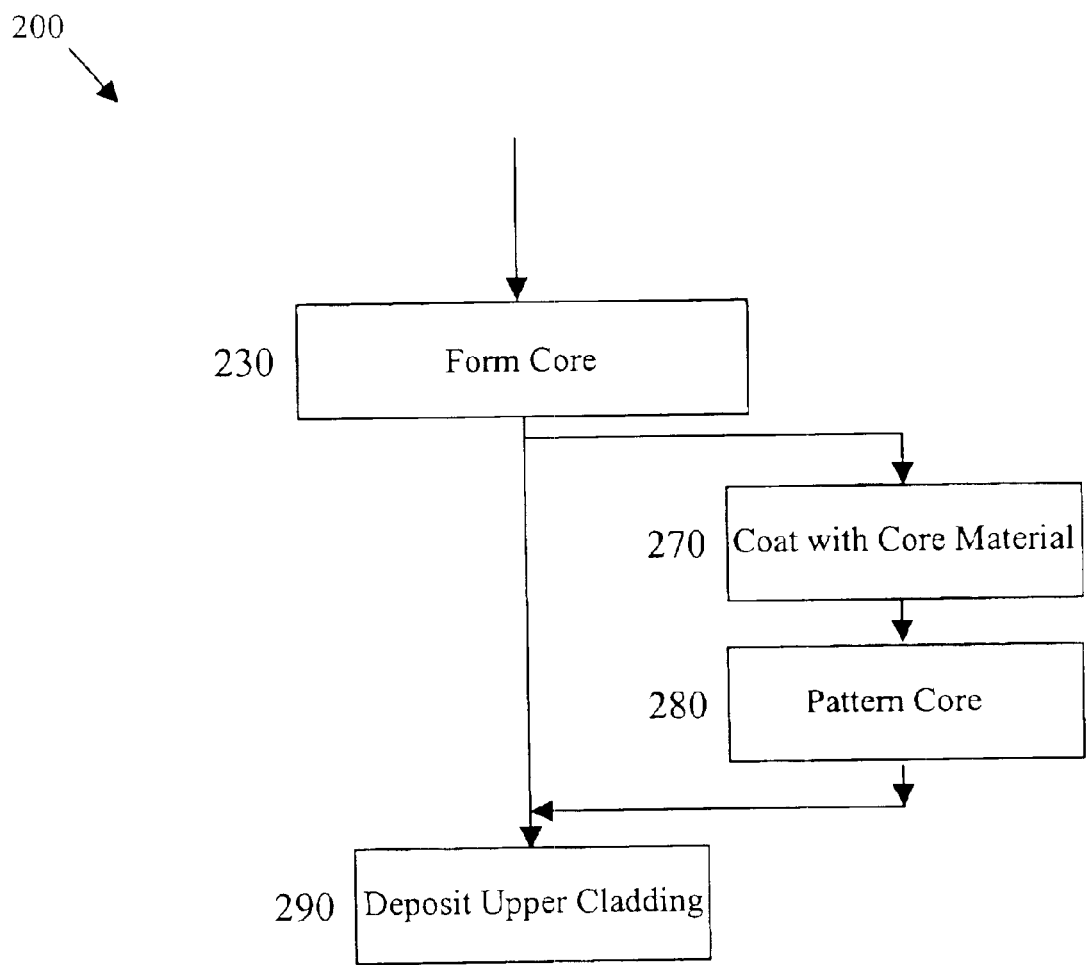

As illustrated by the flow diagram in FIGS. 2A and 2B, another embodiment of the present invention is a method 200 of manufacturing a waveguide, similar to that illustrated in FIG. 1. The method 200 includes a step 210 of providing a substrate, such as any of the above-described substrates (FIG. 2A). The method 200 also includes a step 220 of depositing one or more cladding layers comprising more or more silsesquioxane oligomer adjacent the planar waveguide (FIG. 2A). The method further comprises a step 230 of forming a planar waveguide core over the substrate (FIG. 2B).

Turning FIG. 2A, in certain preferred embodiments, providing the substrate may further include a cleaning step 215. The cleaning step is preferably a conventional oxygen reactive etch or chemical etch using for example standard cleaner 1, well known to those of ordinary skill in the art. In other preferred embodiments, the depositing step 220 may comprise the step 240 of preparing a mixture of a silsesquioxane precursor (SP) and an optional curing agent (CA). In yet other embodiments, however, curing may be achieved via heat or other forms of electromagnetic radiation. In particular preferred embodiments, the silsesquioxane precursor may include monomer or partially polymerized monomer, termed pre-staged oligomers, or combinations of both to create a more viscose mixture. In certain embodiments, the pre-staged oligomers have an average molecular weight of about 10,000 g/mol. Such pre-staged oligomers may be purchased from commercial sources (Techneglas Corp., Perrysburg, Ohio.).

In certain embodiments, the curing agent may be dissolved in a volatile polar organic solvent, such as acetone, to facilitate uniform mixing with the oligomer. In such embodiments, the organic solvent is preferably removed prior to the subsequent depositing and heating steps, 250, 260, discussed below. In alternative embodiments, however, the curing agent may be dissolved in a less volatile, solvent, such as n-butanol, and the mixture of silsesquioxane precursor and curing agent applied as a thin film, for example, between about 0.5 and about 10 microns, without taking any further steps to remove the solvent prior to coating, for example, spin coating.

The curing agent facilitates the condensation of silsesquioxane precursor to silsesquioxane oligomers and the formation of the silsesquioxane backbone structure when bulky pendant groups are present. In certain preferred embodiments, the silsesquioxane precursor may comprise methyltriethyoxysilane and one or more of dimethyldiethyoxysilane and phenyltriethoxysilane monomers. Procedures for forming the silsesquioxane oligomer comprising such silsesquioxane precursors are described in Bautista, for example.

In yet other advantageous embodiments, the curing agent is selected from the group consisting of an organic protic acid containing up to 10 carbon atoms or an organic amine containing up to 10 carbon atoms. In certain preferred embodiments, for example, where phenyl pendant groups are present, the curing agent comprises phenylphosphonic acid. In particular preferred embodiments, the curing agent may comprise a silane, such as 3-aminopropyl triethoxysilane. In such embodiments, the curing agent may also serve to facilitates adhesion of the cladding to the core, or to the substrate, thereby deterring delamination. For example, the silane group of 3-aminopropyl triethoxysilane has strong polar interactions with a glass substrate. Alternatively, a separate adhesion promoter, such as 3-methacrylate propyl triethoxysilane, may be used. In certain embodiments, the amount of curing agent used may range between about 0.5 to about 10 weight percent, and preferably about 2 to about 3 weight percent, with respect to the oligomer.

The depositing step 220 may also include a step 250 of depositing the mixture of the silsesquioxane precursor and curing agent over the substrate and heating in step 260 the mixture to between about 100° C. and about 300° C., and preferably about 220° C., for at least about 3 hours. In certain preferred embodiments, the silsesquioxane precursor is a solvent-free liquid having an intrinsic viscosity at ambient temperature (i.e., from about 20 to about 25° C.) of less than about 5000 cps, and more preferably less than about 2500 cps. The use of silsesquioxanes having such viscosities permit the use of a number of spreading procedures and facilitates the formation of a more uniform cladding layer. In addition, the use of such a low viscosity silsesquioxanes eliminates the need to use a solvent to dissolve a solid oligomer so as to facilitate spreading. Depositing the mixture in step 250 may be accomplished by a number of conventional techniques, such as spin coating, doctor blading, dip coating, or molding.

Turning now to FIG. 2B, the step 230 of forming the planar waveguide core may further include the planar waveguide core formed on at least one of the cladding layers. Such embodiments may include a step 270 of coating the cladding layer with a layer of a core material, and a step 280 of patterning the core material to form a planar waveguide core. Methods to form the planar waveguide core may include spin-coating, stamping, molding or chemical vapor deposition, followed by photolithography or other lithographic methods, including masking and etching.

In still other embodiments, for example, where the core comprises one or more organic polymers, the core may be formed by any of the above-described techniques used to deposit the cladding layer. In still other preferred embodiments, the planar waveguide core may be deposited in step 290 with an upper cladding layer comprising a silsesquioxane oligomer and any of the optional embodiments discussed herein. In yet another embodiment, the planar waveguide core is formed on at least one of the cladding layers.

Figure 3:
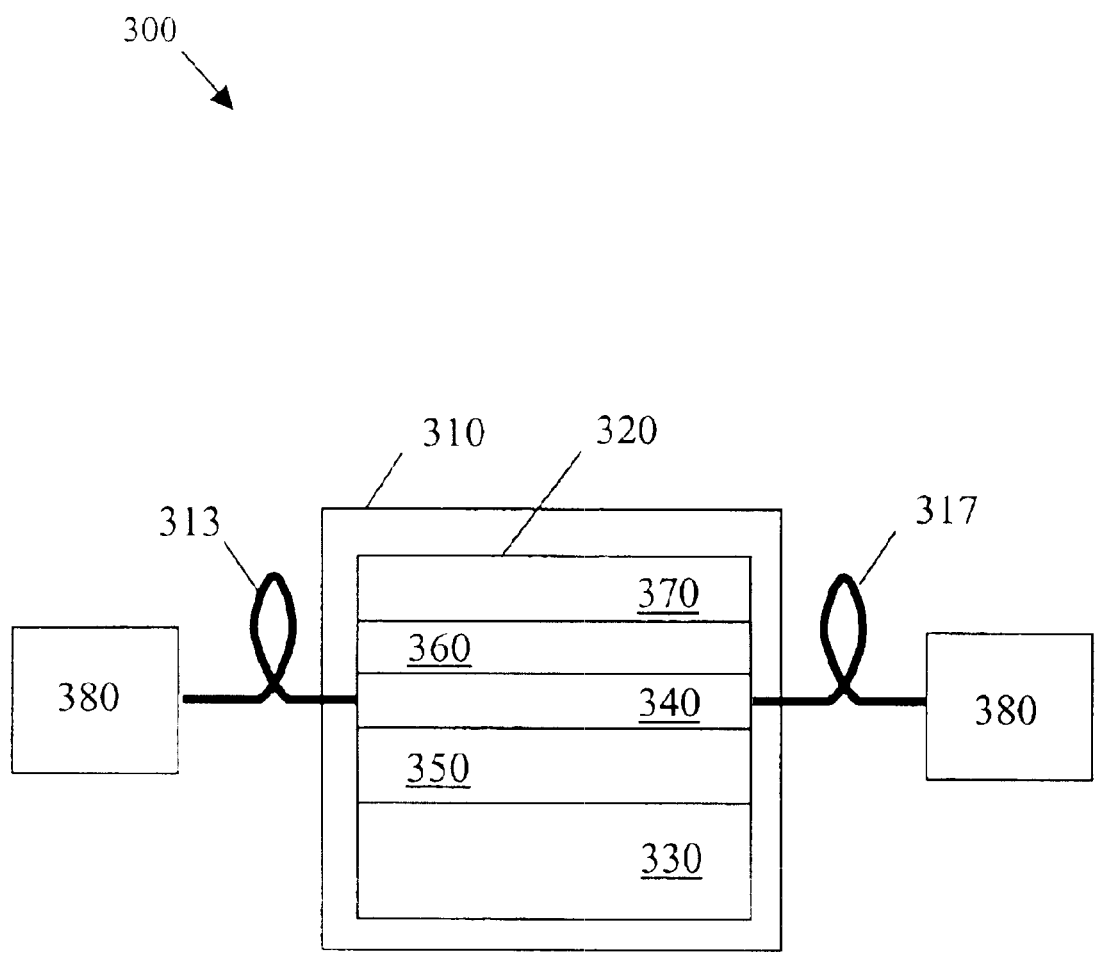
FIG. 3 illustrates an optical communication system, which may form one environment where an optical device, comprising a waveguide similar to that shown in FIG. 1, is included.

Turning to FIG. 3, illustrated is a cross-sectional view of an optical communications system, 300, which may form one environment in which an optical device 310 of the present invention, may be used. The system 300 may further include input 313 and output 317 optical fibers coupled to the optical device 310. The device 310, may include a waveguide 320 comprising a substrate 330, a planar waveguide core 340 and a cladding layer located adjacent the planar waveguide core 350, and comprising one or more silsesquioxane oligomer and any embodiments discussed herein. In certain embodiments, the cladding layer 350 is located between the substrate 330 and the core 340, as depicted in FIG. 3.

In other embodiments, the waveguide 320 may further include a second cladding layer 360 located between the planar waveguide core 340 and a one or more electrodes 370 located adjacent the second cladding layer 360. For example, the electrode 370 may be located above the second cladding layer 360, as depicted in FIG. 3, or under the second cladding layer 360, or both (not shown). In certain embodiments, the optical device 310 may comprise any number of optical device components known to those of ordinary skill in the art. Non-limiting examples include an optical switch, modulator, splitter, filter, coupler, grading, ring resonator, compensator or attenuators. And, in still other preferred embodiments the optical device may be further coupled, via either the input 320 and output 330 optical fibers, to one or more communication components 380, such as lasers, photodetectors, optical amplifiers, transmitters, optical couplers, or receivers.

Although the present invention has been described in detail, those skilled in the art should understand that they can make various changes, substitutions and alterations herein without departing from the scope of the invention.

What is claimed is:

1. A planar waveguide, comprising:
   a substrate;
   a planar waveguide core layer located over said substrate; and
   one or more cladding layers located adjacent said core layer, said cladding layers comprising one or more silsesquioxane oligomers, and said silsesquioxane oligomers further comprise a methyl and a dimethyl substitution.

2. The waveguide as recited in claim 1 wherein said silsesquioxane oligomers comprises methyl, dimethyl and phenyl substitutions.

3. The waveguide as recited in claim 1 wherein a molar ratio of said dimethyl to said methyl substitution is between about 0.5 and about 3.0.

4. A planar waveguide, comprising:
a substrate;
a planar waveguide core; and
a cladding layer located between said substrate and said planar waveguide core, said cladding layer comprising a silsesquioxane oligomer, wherein said silsesquioxane oligomer comprises a methyl and a dimethyl substitution.

5. The waveguide as recited in claim 4 wherein said silsesquioxane oligomer further comprises
a phenyl substitution.

6. The waveguide as recited in claim 4 wherein said cladding layer has a thickness of at least about 2 microns.

7. The waveguide as recited in claim 4 wherein said cladding layer has a surface with said core layer having a surface roughness of less than about 100 nm.

8. The waveguide as recited in claim 7, wherein said surface roughness is less than about 5 nm and said waveguide has at least about 0.3 dB/cm more light throughput than a substantially identical second planar waveguide except that said second planar waveguide has a surface roughness of about 100 nm.

9. The waveguide as recited in claim 4 wherein said cladding layer comprises a first cladding layer, and further includes a second cladding layer located between said first cladding layer and said substrate, said second cladding layer having a refractive index lower than a refractive index of said first cladding layer.

10. The waveguide as recited in claim 4 wherein said cladding layer have a refractive index that is at least about 0.01 percent lower than a refractive index for said planar waveguide core.

11. The waveguide as recited in claim 10 wherein said planar waveguide core comprises an organic polymer having a refractive index of between about 1.4 and about 1.8.

12. The waveguide as recited in claim 11 wherein said organic polymer comprises a copolymer of polymethylmethacrylate and hydroxyethylmethacrylate.

13. A method of manufacturing a waveguide, comprising:
providing a substrate;
forming a planar waveguide core over said substrate; and
depositing one or more cladding layers comprising one or more silsesquioxane oligomers adjacent said planar waveguide core, and said silsesquioxane oligomer further comprises a methyl and a dimethyl substitution.

14. The method as recited in claim 13 wherein said depositing comprises:
preparing a mixture of a silsesquioxane precursor and a curing agent;
spreading said mixture over said substrate; and heating said mixture to at least about 100° C. for at least about 3 hours.

15. The method as recited in claim 14 wherein spreading said mixture comprising a technique selected from the group consisting of:
spin coating;
doctor blading;
dip coating; and
molding.

16. The method as recited in claim 14 wherein said silsesquioxane precursors comprise methyltriethyoxysilane and one or more of the group consisting of:
dimethyldiethyoxysilane; and
phenyltriethoxysilane.

17. The method as recited in claim 14 wherein said curing agent is selected from the group consisting of:
an organic protic acid containing up to 10 carbon atoms; and
an organic amine containing up to 10 carbon atoms.

18. The method as recited in claim 13 further comprising
depositing an upper cladding layer above said planar waveguide core, said upper cladding layer comprising a second silsesquioxane oligomer and said second silsesquioxane oligomer further comprises a methyl pendant group and one or more pendant groups selected from the group consisting of:
a dimethyl group; and
a phenyl group.

19. The method as recited in claim 13 wherein said planar waveguide core is funned on at least one of said cladding layers.

20. An optical communications system, comprising:
an optical device, including;
a planar waveguide comprising
a substrate;
a planar waveguide core; and
a cladding layer located adjacent said planar waveguide core, said cladding layer comprising one or more silsesquioxane oligomers, and said silsesquioxane oligomer further comprises a methyl and
a dimethyl substitution;and
input and output optical fibers coupled to said optical device.

21. The optical communications system as recited in claim 20 wherein said cladding layer is located between said substrate and said planar waveguide core.

22. The optical communications system as recited in claim 21 wherein said waveguide further includes a second cladding layer located between said planar waveguide core and an electrode located adjacent said second cladding.

23. The optical communications system as recited in claim 20 wherein said optical device is selected from the group consisting of:
an optical switch;
an optical modulator;
an optical splitter; and
an optical filter.

* * * * *